United States Patent

[11] 3,563,602

[72] Inventors Seizho Ohta
 Toyota-shi;
 Motokuni Kage, Aichi-ken, Japan
[21] Appl. No. 764,486
[22] Filed Oct. 2, 1968
[45] Patented Feb. 16, 1971
[73] Assignee Toyota Jidosha Kogyo Kabushiki Kaisha
 Aichi-ken, Japan
[32] Priority Oct. 4, 1967
[33] Japan
[31] 84015

[54] ADJUSTABLE HEAD REST FOR VEHICLE SEAT
 9 Claims, 4 Drawing Figs.
[52] U.S. Cl. ................................................. 297/410
[51] Int. Cl. ................................................. A47c 7/36,
 A47c 7/42
[50] Field of Search ........................................ 297/408,
 410; 248/157, 168, 405, 407, 408; 108/146, 147

[56] References Cited
UNITED STATES PATENTS
| 1,867,600 | 7/1932 | Schwarzkoph | 297/410 |
| 3,063,751 | 11/1962 | Hatch | 297/410 |
| 3,285,208 | 11/1966 | Cohen | 248/408 |

Primary Examiner—Casmir A. Nunberg
Attorney—George B. Oujevolk

ABSTRACT: An adjustable head rest for a vehicle seat is formed by supporting rod fitted at its upper end into a head rest member and at its lower end into the frame of the vehicle seat. Means are adjustably positionable on the supporting rod for varying the height of the head rest above the seat. For such adjustable positioning a plurality of recesses are formed along the supporting rod. The edge of a hole through which the supporting rod passes is brought into engagement within one of the recesses under the biasing force of a resilient tongue in the retaining member propped against the supporting rod.

PATENTED FEB 16 1971
3,563,602
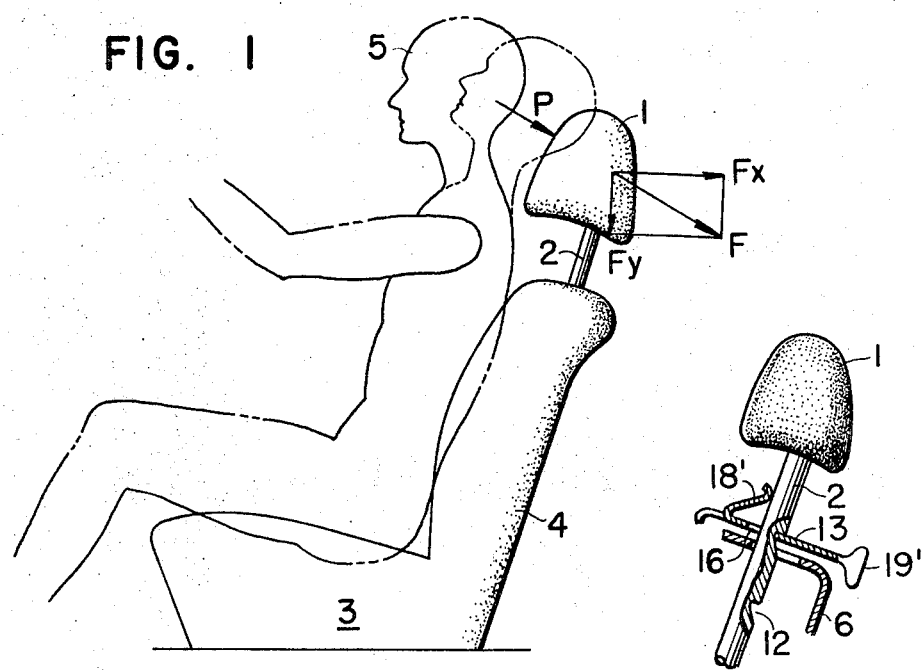
FIG. 1
FIG. 4
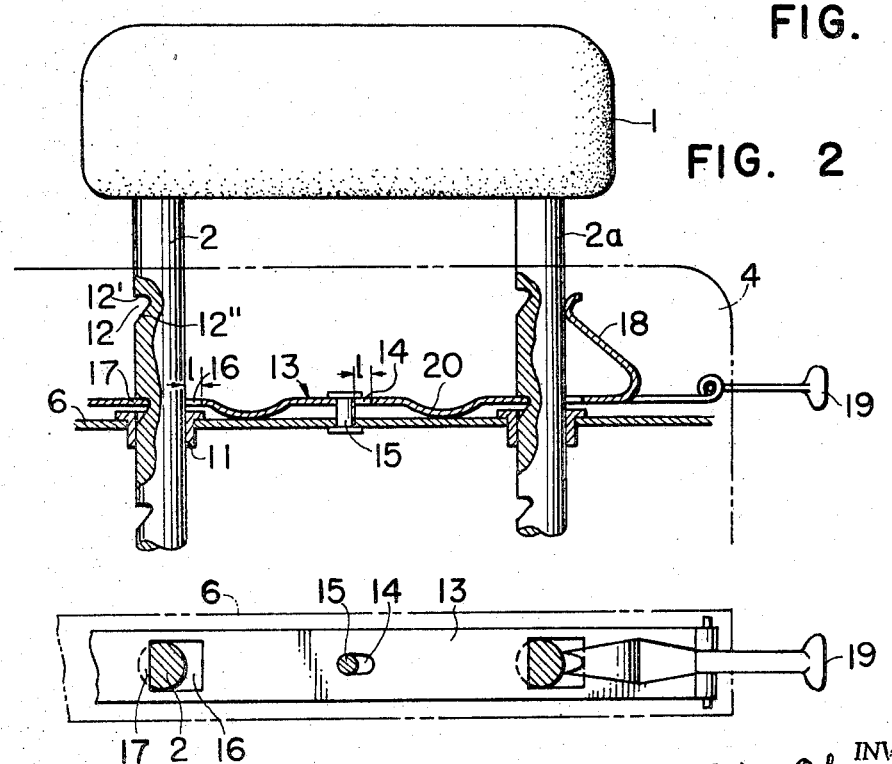
FIG. 2
FIG. 3
INVENTORS
Seizo Ohta
Motokuni Kage
BY George B. Oujevolk
ATTORNEY 3,563,602

ADJUSTABLE HEAD REST FOR VEHICLE SEAT

SUMMARY OF THE INVENTION

The present invention relates to a head rest assembly for a vehicle seat, and more particularly to means for adjustably positioning the head rest relative to the vehicle seat.

Recently head rests have been used on the seats in motor vehicles to limit the severity of head and neck injuries caused by rear end collisions. The great number and seriousness of neck injuries, often referred to as whip lash injuries, caused by rear end collisions has pointed up the need to afford protection for the driver and passengers from such injuries. However, while head rests limit the extent to which a person's head is thrown rearwardly as the result of a rear end collision, it must also be kept in mind that the rearward field of vision of the driver must not be seriously reduced.

In maintaining the size of the head rest within limits which will not encroach, to any great extent, on the field of vision of the driver it is also important to provide a head rest which is adjustably positionable to the height of the person using the seat. Moreover, since the adjustment of the head rest is normally a hand operation, the adjustment means must be easy to use while affording a positive engagement for the head rest in the desired position.

When a collision takes place and a person's head is thrown rearwardly, it generally strikes the head rest in a downwardly inclined direction whereby the force of the impact has a vertical and a horizontal component. Various experiments have shown that the vertical component of impact often exceeds 60kg. As a result, it is necessary to provide locking means or other support means for holding the head rest in place against such a downward component of force. Therefore, it would not be adequate to provide a frictional engagement between the support rod for the head rest and the seat frame sufficient to counteract the vertical component of impact since such an arrangement would make adjustment extremely difficult. For ease in adjustment the means for positioning the head rest must be simple to operate, yet adequate to withstand the force generated by the impact of a person's head against the head rest.

Accordingly, it is the primary object of the present invention to provide a head rest assembly whose height above the seat is easily adjustable, yet is sufficient to support the head rest against the impact when a person's head is thrown rearwardly against it.

Another object of the invention is to provide positioning means simple in structure as well as in manufacturing thereof.

Other objects and advantages of the invention will be apparent from the description taken in connection with the drawing.

In accordance with the present invention, a head rest member for a vehicle seat is mounted on the upper end of at least one supporting rod while the lower end of the supporting rod is fitted within the frame of the vehicle seat. Means are provided for engaging the supporting rod to support it from the vehicle seat whereby the height of the head rest member is adjustable relative to the vehicle seat.

BRIEF DESCRIPTION OF THE DRAWING

In the drawings:

FIG. 1 is a schematic side view of a vehicle seat and a head rest, and illustrates the components of force acting on the head rest due to a rearwardly directed impact;

FIG. 2 is a front view, partly in section, of one embodiment of the present invention for adjustably positioning the head rest;

FIG. 3 is a plan view of a retaining member, shown in FIG. 2; and

FIG. 4 is a side view of a slightly modified embodiment of the invention concept.

DETAILED DESCRIPTION OF PREFERRED EMBODIMENTS

In FIGS. 1 to 3 a head rest assembly formed of a head rest member 1 and supporting rods 2, 2a are mounted on the top of a vehicle seat 3. Which may be of any known type. In FIG. 1 the normal position of the head 5 of a person seated in a vehicle is shown in full lines. If the vehicle is involved in a rear end collision, there is a tendency for the person's head 5 to snap rearwardly, as shown in dot-dash lines in FIG. 1, and to strike the head rest member 1 in the direction indicated by the arrow P. Due to the direction of impact against the head rest member 1, the impact force F has a horizontal component of force $Fx$ and a vertical component of force $Fy$. The vertical component of force $Fy$ tends to force the head rest downwardly into the back 4 of the seat 3.

On the other hand, since there can be considerable variation in the height of a person's head above the back 4 of the seat, it is important to provide a wide range of adjustability for the head rest member and, at the same time to employ means which are easily manipulatable for properly adjusting the height of the head rest member 1.

The head rest member 1 is supported on the back 4 of the seat by means of two supporting rods 2, 2a. Since the rods 2 and 2a are of same construction, there will be described the rod 2 hereinafter. The rod 2 extends downwardly through a guide bush 11 fitted in the top of the frame 6 of the seat.

Along one side of the supporting rod 2 in its longitudinal direction there are formed at intervals a plurality of wedge-shaped recesses 12 each consisting of a face 12' perpendicular to the axis of the rod and a face 12" extending downwardly at an acute angle to the face 12'. Mounted on the frame 6 is a resilient retaining strip 13 made of metal. The retaining strip 13 is selectively engageable with one of the recesses 12 of the rod 2 for adjustably positioning the height of the head rest member 1 above the back 4 of the seat. For this purpose, the retaining strip 13 is formed with a slot 14 in engagement with a rivet 15 secured to the frame 6 so that it can displace by the distance $l$ only along the frame 6. The distance $l$ corresponds substantially to the depth of the recesses 12. The retaining strip 13 has a hole 16 through which the supporting rod 2 passes. The edge 17 on the recess side of the hole 16 engages, as an engagement edge, within one of the recesses 12 of the rod 2 in the position of the retaining strip 13 shown in FIGS. 2 and 3 while the opposite edge of the hole 16 is separated by the dimension $l$ from the opposite side of the rod 2.

On the opposite side of the recesses of the rod, a tongue 18 is cut and bent obliquely upwardly towards the rod 2 from the retaining strip 13. The tongue 18 is propped at its free end against the rod 2, and biases the retaining strip 13 in such a manner that the edge 17 of the hole 16 comes into engagement within the recess 12. In order that the retaining strip 13 can be moved against the biasing force of the tongue 18 so as to get the engagement edge 17 out of engagement within the recess 12, a pushing knob 19 is mounted to one end of the retaining strip 13. It will be self-evident that a drawing knob can be mounted to the other end of the retaining strip 13. For protection of the retaining strip 13 from an expected displacement the retaining strip 13 is formed convex towards the frame 6 at suitable portions 20 so that a suitable friction between those convex portions 20 and the frame 6 is produced.

When it is necessary to decrease the height of the head rest member 1 above the back 4 of the seat, the knob 19 is pushed against the action of the tongue 18. In this position the engagement edge 17 is released from the recess 12 in the supporting rod 2 and the head rest member 1 can be lowered vertically. Once the desired height of the head rest is established, the knob 19 is released and the edge 17 again engages the selected recess in the rod 2 for lockingly engaging the support rod 2 and holding it in place on the frame 6 of the seat. For increase of the height of the head rest member 1, it is necessary only to grip the head rest member 1 and pull it upwardly. Then, the engagement edge 17 gets out of the recess 12 with upward displacement of the rod 2, and the desired height of the head rest is established in such a manner as described above.

With the head rest locked in place as indicated in FIG. 2, of an impact, as shown in FIG. 1, is imparted to the head rest, the retaining strip 13 will prevent it from being depressed downwardly into the back of the seat, since the face 12' of the recess 12 rests on the engagement edge 17 of the hole 16 in the retaining strip 13, and the backward movement of the person's head will be arrested thereby preventing any serious injury to the neck.

A slightly modified embodiment is shown in FIG. 4. This embodiment differs from the first embodiment in that engagement of the retaining strip with supporting rods is effected in the direction perpendicular to that in the first embodiment. A pushing knob 19' is provided at the rear of the retaining strip 13. Since the operation is similar to that of the first embodiment, the description thereof may be omitted.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A head rest assembly for a vehicle seat having a seat frame comprising a head rest member (1), at least one supporting rod (2) secured at its upper end to said head rest member and adapted to extend downwardly with its lower end disposed within said vehicle seat frame, a plurality of recesses (12) formed along one lateral side of said supporting rod in a longitudinally spaced relation, said recesses being substantially wedge-shaped having a first face (12) substantially perpendicular to the axis of the rod and a second face (12") extending downwardly at an angle to the first face, a strip-shaped resilient retaining member (13) mounted on said frame and movable for a predetermined distance along said frame in a plane substantially normal to said rod (2) in the lateral direction of said vehicle seat and having a hole with an edge through which said rod passes, a tongue member (18) cut and bent obliquely upwardly towards said rod from said retaining member, said tongue member being propped at the free end thereof against said rod thereby urging the edge of said hole to come into engagement with one of said recesses.

2. A head rest assembly for a vehicle seat back which is mounted on said vehicle seat frame, comprising in combination:
   a. a head rest member;
   b. a supporting rod (2) fitted at its upper end into said head rest member and at its lower end into said frame having spaced engageable recesses (12) thereon; and
   c. an elongated retaining member (13) with a retaining side and a biasing side, mounted on said frame and movable for a predetermined distance along said frame in a plane substantially normal to said rod (2) and having a hole with an edge through which said rod passes on the retaining side, biasing means (18) on said biasing side for biasing said edge into one of said recesses and, handling means (19) for manually engaging and disengaging said biasing means (18) from said recesses at one end of said elongated retaining member.

3. A head rest assembly as claimed in claim 2 wherein said retaining member extends longitudinally across said back, said recesses being formed in a plane defined by the seat back.

4. A head rest assembly as claimed in claim 2 wherein said retaining member extends in a direction substantially normal to the plane defined by said back, said recesses being formed substantially at right angles to said defined plane.

5. A head rest assembly as claimed in claim 3 wherein said recesses are substantially wedge-shaped having a first face (12) substantially perpendicular to the axis of the rod and a second face (12") extending downwardly at an angle to the first face.

6. A head rest assembly as claimed in claim 3 wherein said retaining member (13) has a slot (14) in engagement with a rivet (15) secured to said frame, the length of said slot defining the distance said retaining member (13) is movable along said frame.

7. A head rest assembly as claimed in claim 4, wherein said recesses are substantially wedge-shaped having a first face (12) substantially perpendicular to the axis of the rod and a second face (12") extending downwardly at an angle to the first face.

8. A head rest assembly as claimed in claim 4, wherein said retaining member (13) has a slot (14) in engagement with a rivet (15) secured to said frame, the length of said slot defining the distance said retaining member (13) is movable along said frame.

9. A head rest assembly as claimed in claim 1, wherein said retaining member (13) has a slot (14) in engagement with a rivet (15) secured to said frame, the length of said slot defining the distance said retaining member (13) is movable along said frame.